Nov. 26, 1940.  J. JANDASEK  2,222,618
TURBINE TORQUE CONVERTER COMBINED WITH TURBINE CLUTCH
Filed Jan. 22, 1932  5 Sheets-Sheet 2
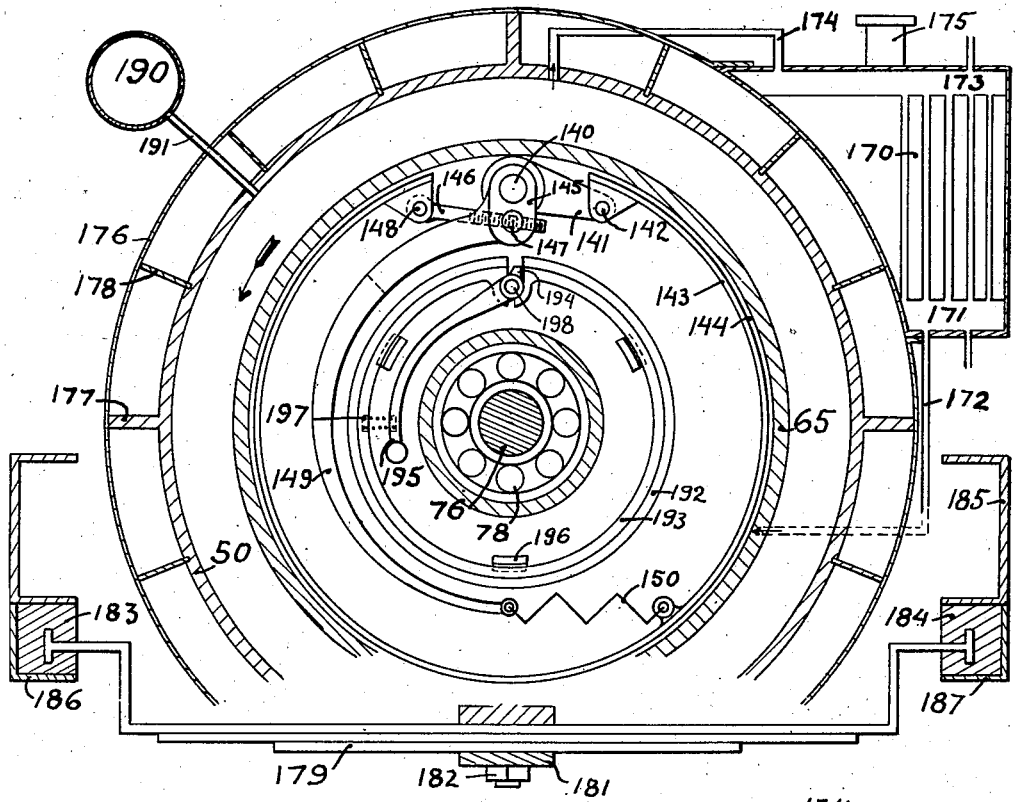
Fig. 5
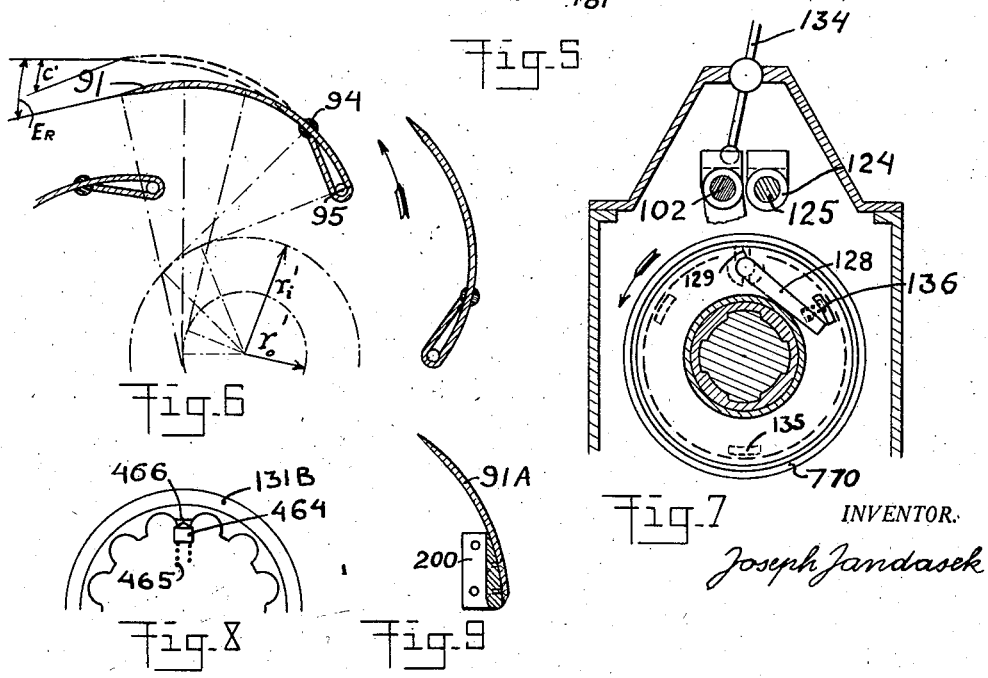
Fig. 6  Fig. 7
Fig. 8  Fig. 9
INVENTOR.
Joseph Jandasek Nov. 26, 1940.  J. JANDASEK  2,222,618
TURBINE TORQUE CONVERTER COMBINED WITH TURBINE CLUTCH
Filed Jan. 22, 1932  5 Sheets-Sheet 3
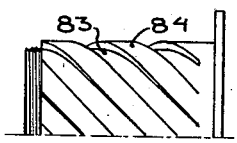
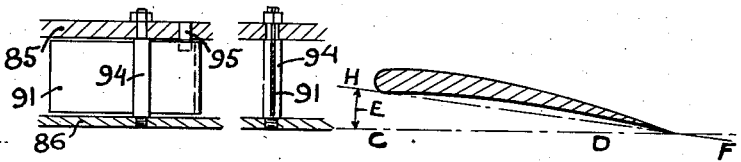
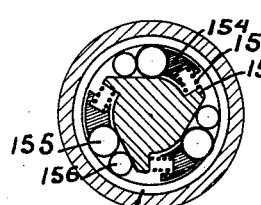
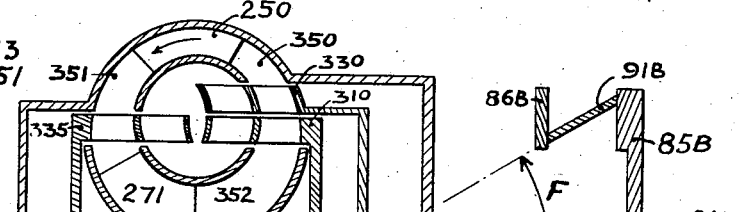
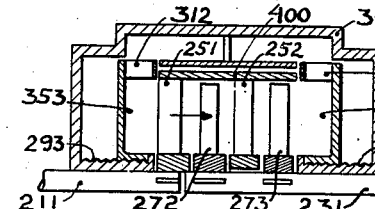
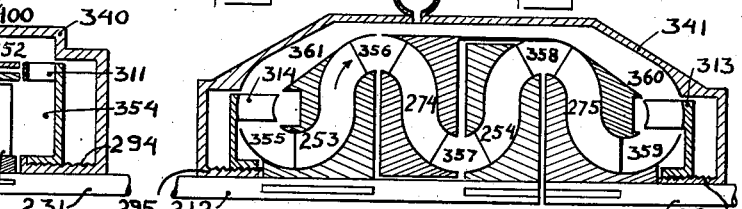
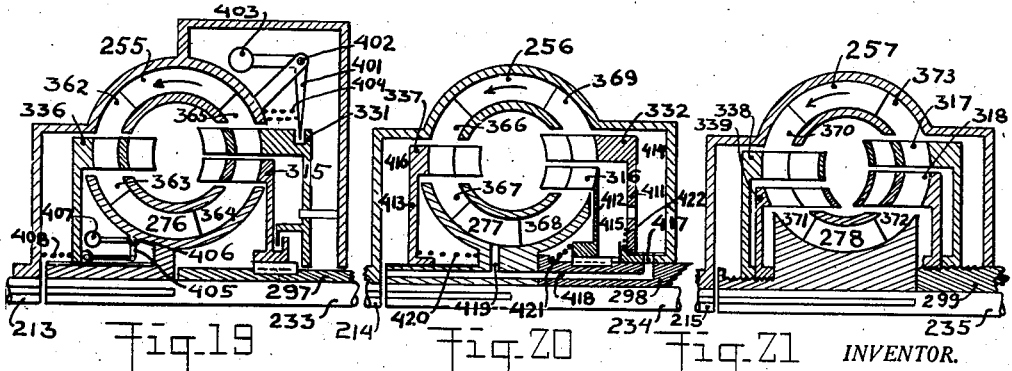
INVENTOR.
Joseph Jandasek

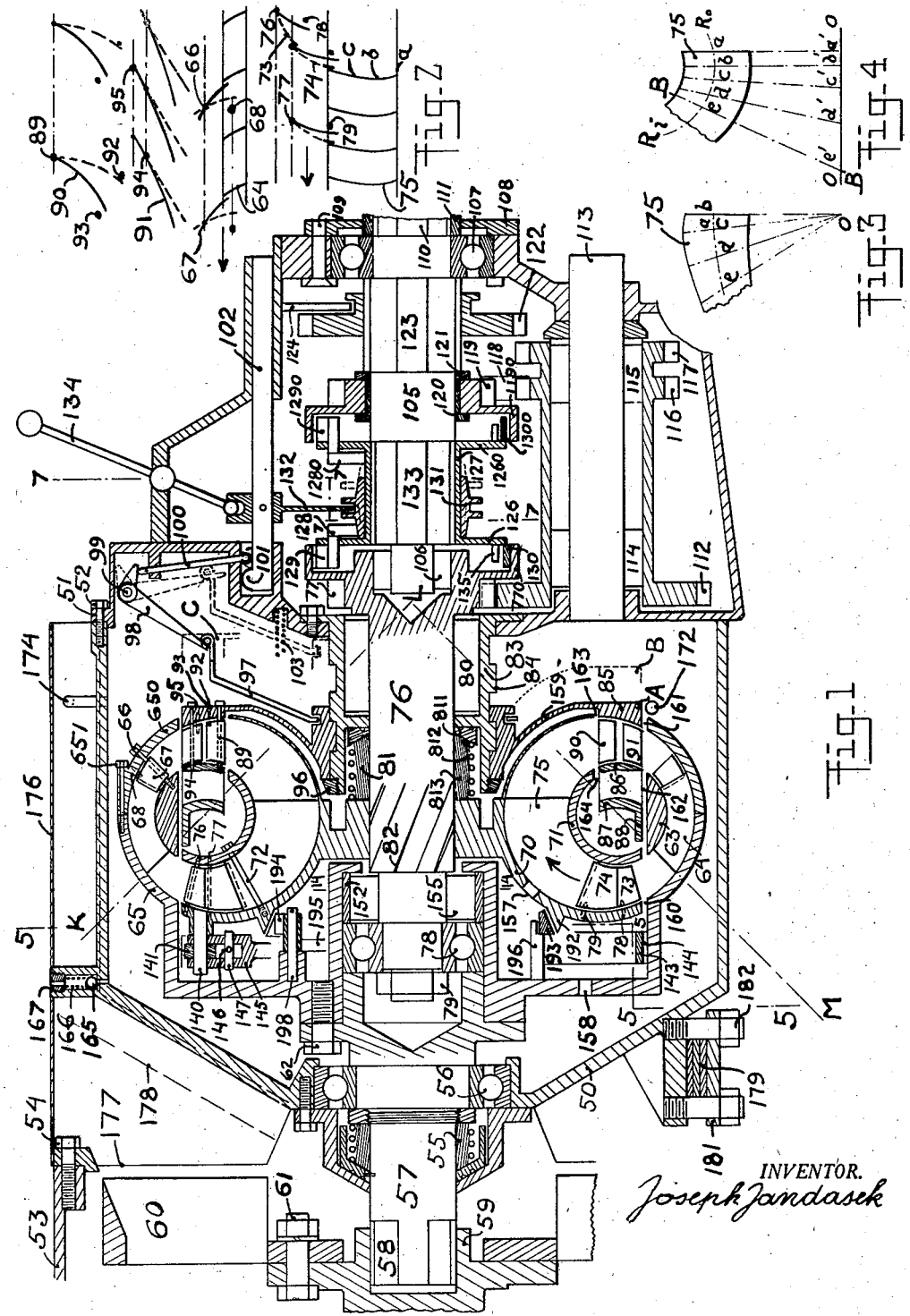

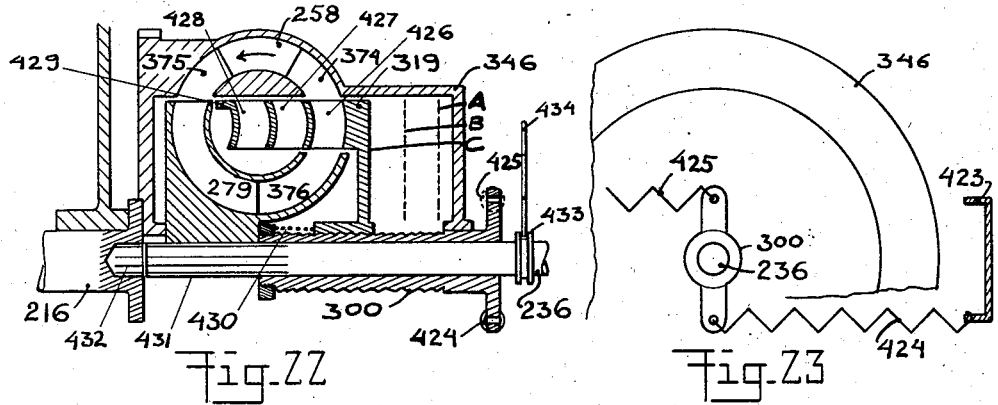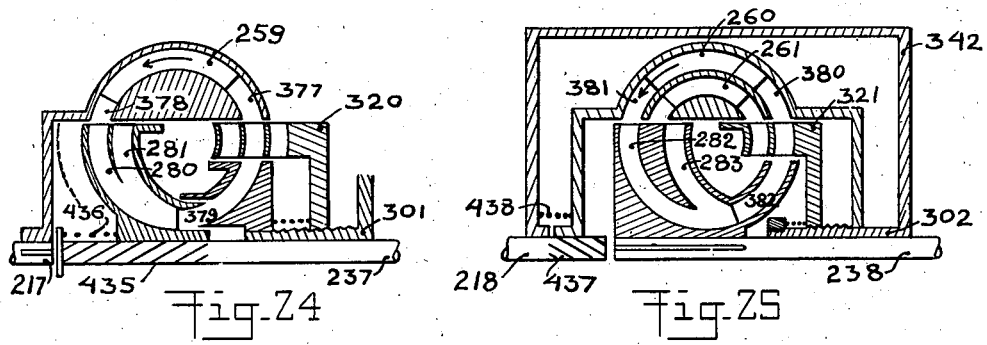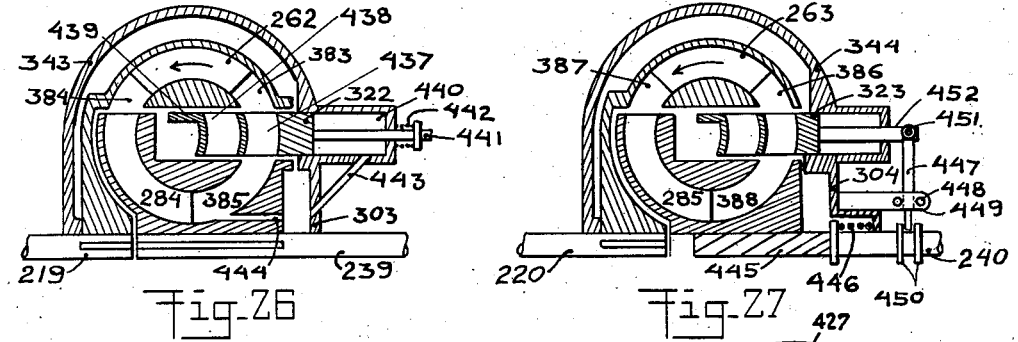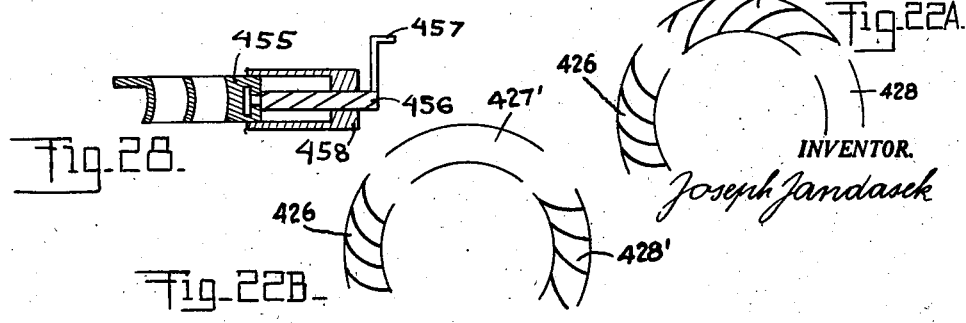

Nov. 26, 1940.   J. JANDASEK   2,222,618
TURBINE TORQUE CONVERTER COMBINED WITH TURBINE CLUTCH
Filed Jan. 22, 1932   5 Sheets-Sheet 5
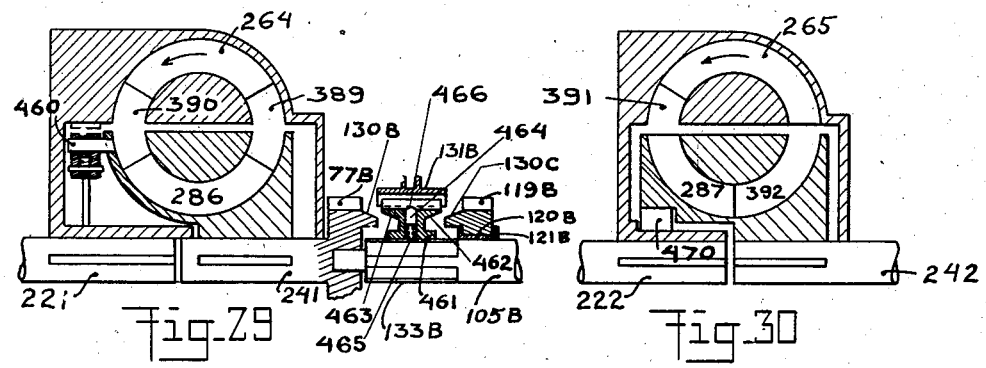
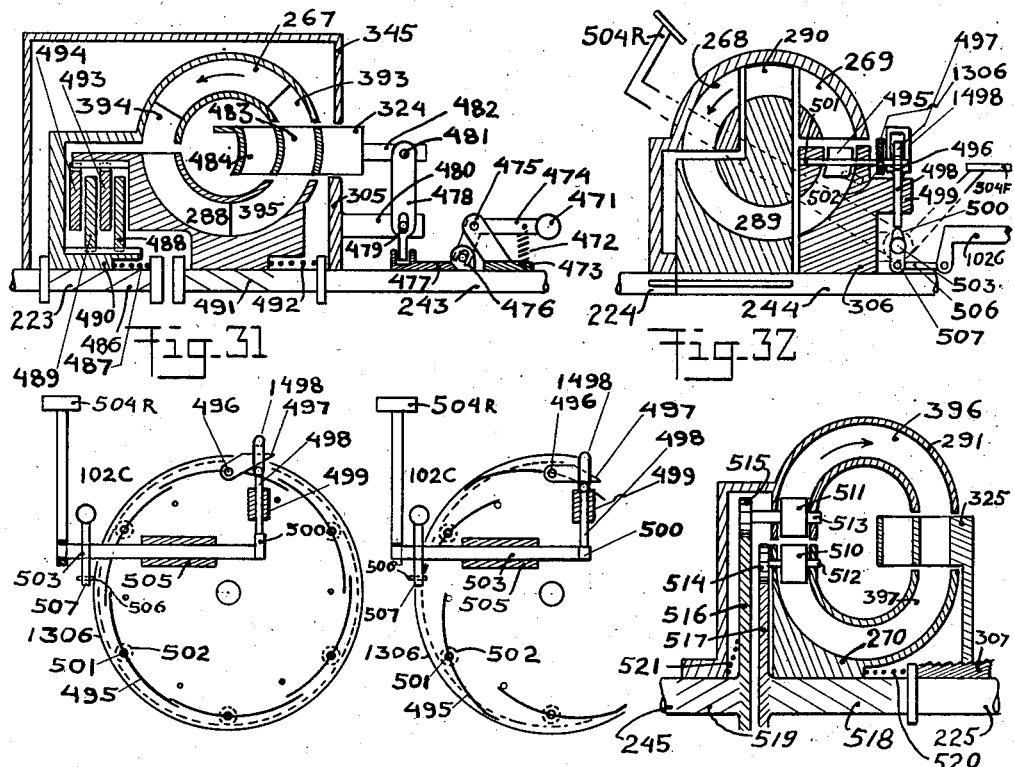
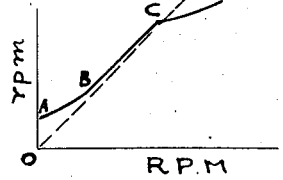
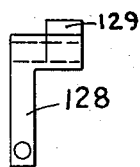
INVENTOR.
Joseph Jandasek Patented Nov. 26, 1940

2,222,618

UNITED STATES PATENT OFFICE 2,222,618

TURBINE TORQUE CONVERTER COMBINED WITH TURBINE CLUTCH

Joseph Jandasek, Cicero, Ill.

Application January 22, 1932, Serial No. 588,163

43 Claims. (Cl. 192—3.2)

This invention relates to a rotary apparatus for the transmission of power of the type comprising a passage for fluid including a pump impeller, a turbine runner and a stationary guide wheel.

The invention provides a high speed rotary mechanism for the transmission of power by means of a fluid at varying speeds such that from any applied driving speed and torque a driven speed and torque are obtained of which the torque varies automatically in accordance with the load and the speed varies inversely as the torque, the efficiency being high throughout the whole range of speeds.

In hitherto known constructions devised to obtain a difference in speed between the driving and driven members, fixed blades on the impeller and on the runner wheels have been used. But with such construction it is possible to obtain efficient transmission of power only when the difference in speed between the impeller and the runner is some predetermined amount, and the apparatus becomes less efficient the more this predetermined difference in speed is departed from.

In order to overcome this difficulty I have used eccentrically pivoted vanes for the impeller and runner, and a shiftable guide wheel, which vanes are automatically adjustable under the influence of the fluid. At the same time I have provided the runner, the impeller, and the guide wheel with a series of vanes; the best efficiency of the device is when gearing ratio is 1:1.

The main object of my invention is to maintain the efficiency of the torque converter constantly high, especially at high speeds, by adjustable vanes and shiftable guide wheel.

Another object of my invention is to provide a new combination of the fluid torque converter with a reverse gear and to provide a quick and positive method for shifting into "forward" or "reverse" by stopping fluid circulation and by inventing a shifting unit equipped with a synchronizing mechanism, so the runner shaft can be locked to the reverse gear shaft at any conditions.

Another object of the present invention is to eliminate automatically functioning of the guide vanes at high speeds, so as to obtain a "direct" drive efficiency.

To attain these and other objects, I have provided the impeller and the runner with vanes pivoted near the entrance edge with the exit edge overlapping the entrance edge of the following vane, so that the pivotal action is restricted in the direction towards the following vane. I have also provided automatically shiftable guide vanes so that at high speed thereof only the impeller and the runner are in the fluid circuit, in order to obtain high efficiency of turbine clutches.

With these and other objects in view, my invention consists in the combination, arrangement, and construction herein described, claimed, and illustrated in the drawings, it being understood that many changes may be made in the parts and details of construction within the scope of the appended claims, without departing from the spirit of the invention.

Some of the many possible embodiments of the invention are illustrated in the drawings, in which:

Fig. 1 is a longitudinal section of a turbine torque converter combined with a change speed gear transmission constructed in accordance with my invention.

Fig. 2 shows diagrammatically positions and curvature of vanes; full line for light loads, dotted lines for heavy loads.

Figs. 3 and 4 illustrate the method of vane designing.

Fig. 5 is a vertical section taken on line 5—5 of Fig. 1.

Fig. 6 shows the arrangement of flexible vanes and illustrates the method of designing their curvature.

Fig. 7 represents a vertical section taken on line 7—7 of Fig. 1.

Fig. 8 is a half vertical view of an outer member of synchronizing clutch.

Fig. 9 illustrates an alternative arrangement of flexible vanes.

Fig. 10 is a half view of stationary sleeve supporting guide wheel.

Figs. 11 and 12 show method of fastening flexible vanes.

Fig. 13 represents shape of an aerofoil.

Fig. 14 is a vertical section taken on line 14—14 of Fig. 1 showing one-way clutch.

Fig. 16 represents a half vertical section of an alternative design of guide vanes.

Figs. 15 and 17 to 22 are half vertical sectional views illustrating other embodiments of the invention.

Fig. 22a illustrates a circumferential sectional view of the channels 426, 427, and 428 with vanes only in channels 426 and 427, both to increase fluid angular momentum, channel 428 is a by-passing channel.

Figure 22B illustrates a circumferential sectional view of the channels 426, 427', and 428' with vanes in channels 426, and 428', but none in 427', this channel serving as a by-passing channel only.

Fig. 23 represents a rear view of device shown in Fig. 22.

Figs. 24 to 32 are half vertical sectional views showing other embodiments of the invention.

Figs. 33 and 34 represent rear views of device drawn in Fig. 32 and illustrate an alternative arrangement of closing guide wheel channels.

Fig. 35 is a half vertical sectional view of a device with automatic adjustment of impeller and turbine blades.

Fig. 36 represents a diagram illustrating ratios of pump impeller (or engine) speed in revolutions per minute (R. P. M.) to turbine runner (or propeller shaft) speed in R. P. M. in devices of Figs. 1 and 32.

Fig. 37 is a view of finger and cam operating clutches in Fig. 1.

The invention will be fully understood by referring to the accompanying drawings forming a part of this specification, in which:

Figures 1 and 5 illustrate a form of my turbine torque converter combined with turbine clutch equipped with a substantially radially arranged turbine runner with three sets of vanes, a substantially axial impeller and a radial guide wheel, each with two sets of vanes. The device is also equipped with a change speed gear transmission for reversing purposes, and with a radiator which cools the fluid.

The numeral 50 indicates a fluid-tight stationary casing to which a cover 51 is fastened by bolts 52; case 50 is rigidly secured to a fly wheel housing 53 of a power engine by screws 54. The case 50 has a stuffing box 55, and a ball bearing 56 for driving shaft 57, which shaft is secured by means of a spline 58 to an engine crankshaft 59; this spline permits relative longitudinal movement, but prevents any rotary movement, in order to facilitate manufacturing and installation of the device. The crankshaft carries a fan-shaped flywheel 60 by means of bolts 61; the flywheel blows the cooling air against the casing 50.

Mounted on shaft 57 by bolts 62 is an impeller assembly consisting of: an impeller shroud 63 to which fixed blades 64 are rigidly secured, an impeller web 65 and 650 fastened together by screws 651, bolts 66, each bolt carrying a rotatable vane 67, pivoted at its leading edge, adjacent to the outlet from the guide wheel, and capable of adjusting itself to the direction of discharge from the guide vanes, the inclination of the vanes 67 is limited on one side by a pin 68, which projects into the impeller channel and serves as a stop (see also Fig. 2), the inclination on the other side is limited by the following fixed vanes 64, because the exit edge of the vanes 67 overlaps the entrance edge of the following vane 64.

In operation, when the fluid velocity decreases at light loads, each vane 67 as a whole turns about its pivot and its entrance angle decreases, see Fig. 2, full line, until it touches the following fixed vane 64. At heavy loads fluid speed increases due to action of guide vanes and the entrance angle of the vanes 67 increases, see Fig. 2, dotted line.

There is a vortex chamber between the guide wheel and the impeller, because impeller entrance diameter is selected greater than gates discharge diameter. In this space between the gates and the impeller, fluid is free to adopt its own manner of motion, which approximates that of a free vortex. In this vortex pressure increases outwards and the circumferential component of fluid velocity decreases.

Runner assembly, see also Figs. 3, 4, consists of: a web 70, a shroud 71, and bolts 72 fastening the shroud to the web. There are two sets of semi-free vanes 73 and 74 and one set of fixed vanes 75. Each semifree vane is pivoted at its leading edge adjacent to the outlet from the impeller, and adjusts itself to the direction of discharge from the impeller; it is provided with a pivot 76 or 77 and with a pin 78, 79 which project into the runner channel and serve as stops in one direction for vanes 73 and 74. The inclination on the other side is limited by the following vane, because the exit edge of each semi-free vane overlaps the entrance edge of the following vane.

Inlet diameter of fixed runner vanes 75 is smaller than discharge diameter of the impeller. In this way a vortex chamber is created between the impeller discharge and the runner inlet changing pressure energy into kinetic energy. In this space fluid is free to adopt its own manner of motion which is that of a free vortex, in this vortex pressure decreases and velocity increases inwards, theoretically following the ordinary free spiral vortex law. In this way circumferential component of fluid velocity at runner vanes, especially at fixed vanes 75, can be increased to such an extent that a comparatively slow speed curvature of vanes can be used and still the runner can operate at very high speeds; in other words, the entrance angle at low speeds and at high speeds does not vary much which diminishes shock or impact losses at intermediate loads.

Secondary shaft 76 integral with a spur gear pinion 77, is supported by a ball bearing 78 using nut 79, and by a roller bearing 80, and is equipped with a stuffing box 81 comprising a sleeve 811, a spring 812, and a packing 813 which parts rotate with driven shaft 76; this shaft carries the runner assembly by means of a spline 82.

Guide vane assembly, see Figs. 6, 10, 11, 12, 16, slidingly secured to a sleeve 83 by means of multiple screw 84 includes: a guide wheel web 85, first shroud 86, second shroud 87 integral with a shutting off sleeve 88, attached to the web by long bolts 89, each bolt carrying a semi-free vane 90. These vanes are pivoted at their leading edges, adjacent to the outlets from the runner blades, and adjust themselves to the direction of discharge from the runner, so that the fluid flows through the entrance guide vanes without shock or impact to the discharge side of the guide wheel, where it is delivered through flexible gates 91 to the impeller. Pins 92 and 93 projecting into the guide wheel channel serve as stops and limit the movement of the vanes 90 in both directions. Flexible gates 91 are pivotally supported by bolts 94, and are held in position by pins 95. At heavy loads the gates deflect under the increasing fluid pressure and their discharge angle increases; in this way the impeller load increases and speed of the impeller and engine cannot increase to such an extent as it does when rigid gates are used. Whenever the pressure of fluid decreases, gates' discharge angle also decreases, and impeller speed increases.

The guide wheel, having discharge diameter larger than discharge diameter of the runner, acts also as a whirlpool or vortex chamber changing kinetic energy of fluid into pressure. In the space between the runner and the gates, fluid is free to adopt its own manner of motion, which approximates that of a free vortex. In this vortex pressure increases outwards, following the free spiral vortex law; circumferential component of the fluid velocity decreases.

Because of the friction, and shock losses of the guide wheel it is a great advantage to shift the guide vanes and the gates out of the fluid circuit entirely at light loads and on level roads. Without a guide wheel my torque converter becomes a turbine clutch where the torque on the runner shaft 76 is at all times equal to the torque of the primary shaft 57, because there are only driving and driven vanes in the fluid circuit, which gives the efficiency of a turbine clutch. On level roads the fluid needs but little retardation of the driven member to develop the required driving torque, hence the lag or "slip" between the driving and driven members is insignificant, about 2 or 3%.

This shifting of guide wheel out of the fluid circuit is accomplished by reaction of fluid against the gates. At low speeds and heavier loads the function of gates is to increase the fluid angular momentum, torque reaction is negative, i. e. opposite to the direction of rotation, in this case the guide wheel is forced by screw 84 on the sleeve 83 (see Fig. 10) into the fluid circuit until stopped by a flange 96, position A in Fig. 1. At light loads and high speeds the tendency of the gates is to decrease the fluid angular momentum, torque reaction becomes positive, i. e. in the direction of rotation; in this case the guide wheel shifted by screw 84 out of the fluid circuit, position B in Fig. 1. Part of the gates must be left to project into the fluid channel so the fluid could turn it back again into the circuit automatically whenever the vehicle and the runner slow down, and whenever additional torque is necessary. A little part of gates, about ⅛ in. long, projecting into the fluid channel is causing little resistance to the flow, as it requires pressure to force the liquid through the gates, while no pressure is required for the flow through bladeless space between shrouds 86 and 87; consequently the tendency for fluid is to go through the bladeless space, and not through the gates. The length of the part of the gates projecting into the fluid channel can be changed according to requirements; naturally, the more the gates project into the channel the bigger is the reaction to shift them and the quicker the gates start to function, which results in faster acceleration. If, however, a slower action is satisfactory, a shorter projecting part of gates is necessary, of course, the smaller is the resistance in fluid flow and better efficiency.

The gates projecting partly into fluid channel do not require any flexible means, springs 103, to facilitate their shifting, for fluid reaction exists at all times, it only changes quantitatively.

Gates equipped with springs 103, to facilitate their shifting, do not need to project in the fluid channel at all, their action being as follows: at first fluid reaction (at light loads and high speeds), shifts the gates, when the gates are almost all out of the channel, the shroud 86 is the only part projecting into the channel. The fluid velocity in the channel has a great circumferential component, at high speeds, in the same direction as the twisting shift of the gates is being accomplished. In other words, fluid reaction shifts the gates by the great part out of the channel, fluid friction shifts the guide wheel shroud by the remaining part of the shift entirely out of fluid circuit until the wheel is stopped by springs 103.

Circumferential velocity of the fluid at guide wheel entrance naturally depends on runner speed: at fast going turbine the whirl velocity is great and fluid impinges the gates on back, at low speed whirl velocity due to turbine speed is small and fluid impinges the gates on their face. Reaction of fluid on gates depends therefore not only on the increased turbine torque but it is directly depending on turbine speed.

As soon as the speed of runner decreases, due to overload, circumferential velocity component of the fluid discharged from slow going turbine diminishes; consequently springs overcome friction and shift the guide wheel back into the channel; as soon as part of the gates is in the channel, reaction takes place of friction and the rest of shift is quickly accomplished by fluid reaction. Therefore the guide wheel can be shifted by means of fluid reaction only, by fluid friction with help of some flexible means, or by a combination: reaction, friction, and spring. The last one results in quickest shift and at the same time in the most efficient operation at high speeds and light loads. In all of the modifications employing guide vanes shiftable relative to the fluid circuit on helical threaded members by the fluid reaction only on the guide vanes it is necessary to have at least a small portion of the guide vanes projecting into the fluid circuit in order to obtain a reaction force to return the guide vanes to the fluid circuit. The initial movement of the guide vanes can also be accomplished by means of the difference in pressure on the outer and inner sides of the guide vane web 85. There is always less fluid pressure in the guide vane circuit channel due to the suction at the entrance to the impeller resulting in more rapid flow of liquid in this part of the fluid circuit. There is, however, greater fluid pressure in the turbine circuit channel between the web 70 and the shroud 71 due to the shape of the vanes (pressure increasing vanes of Figure 2) and due to the slower circulation of the fluid. The space between the web 70 and the shroud 71 is connected by way of passages 157 and 158 to the chamber surrounding the transmission unit. This increased pressure is exerted on the outside of the guide vane web 85, and exerts a force tending to move the guide vane into the fluid circuit.

A complete shut off of the fluid circulation can be accomplished manually, while in operation, by means of a fork 97, a bell-crank 98 pivoted at 99 and operated by a push rod 100, which in turn is operated by a cam 101 integral with a shift rod 102: whenever the shift rod is in neutral position, cam 101 lifts the push rod which turns bell-crank, which in turn shifts the guide wheel into position C. so that the sleeve 88 closes the fluid circuit. When, however, the cam is not lifting the push rod, then the fork is pressed back in position B (not in position A) by a light spring 103. Whenever additional torque is required, the runner slows down, the flow increases, the direction of the flow increases its angle through the gates, consequently the guide wheel turns on the sleeve until it is stopped by the flange, and the torque increasing function of the gates starts automatically: the device becomes a torque converter.

Fig. 3 is a view looking parallel with the axis O, the axis O being the center line of the shaft of Figure 1, and Fig. 4 is a longitudinal view looking perpendicular to the axis O of discharge end of runner vanes, Fig. 4 being an elevational view showing the runner vane 75 as it would be if it were rotated about the axis until it lay in the plane of the paper. In Fig. 3 is drawn a view of the same vane showing the actual projection of the vane looking from the front. Vane surfaces are designed to have the form of a screw surface: this surface is generated when a beam BB cuts the axis O—O of the runner, turns around the same axis and moves longitudinally. At the very end the turning and moving of the beam is uniform and creates a true screw form, axial positions aa', bb', and distance ab in Figs. 2 and 3. A little further the turning as well as the moving increase independently and regenerated surface is a screw form of non-uniform pitch, axial positions of the beam cc', dd', ee', and angular distances bc, cd, de in Fig. 3; points a, b, c, etc. lie on curve $R_0 R_1$ which represents center of the fluid channel. This method is used for substantially axial vanes.

For substantially radial vanes or their ends an involute curve is the best to use (see Fig. 6) because it gives uniform speed of the fluid between the vanes, from inlet to discharge, and can be accurately constructed. Other forms for vanes usually result in incorrect cross sections and nonuniform relative velocities other than those given in the diagrams and impossible to calculate.

The radius of the base circle of the involute at inlet equals $r'_1$, while the radius of the base circle of the involute at the outlet equals $r'_0$. To represent correctly vane surfaces for ends of vanes which are not radial but inclined, as are impeller vanes in Fig. 1, it must be shown as a development of the ends of the vane upon the surface of a cone KLM. The involutes at the end of the blade, that is, at exit from the impeller, are now drawn upon the surface of a cone whose apex L lies at the intersection of the prolonged section line with the axis of the impeller.

In order to reduce resistance, increase capacity and increase the efficiency of vanes, the same are designed to have a form of aerofoil, see Fig. 13, where: CD is a direction of fluid velocity, E is the angle of inclination of chord FH of aerofoil to fluid velocity. The advantage of the aerofoil-shaped vanes is that they are not so sensitive to angular variations as is, however, the case with cell-shaped vanes, as used on Francis turbines, for instance. In this way shock losses due to necessary deviations in entrance angles for practical devices are diminished. For the same reason the number of entrance vanes is selected smaller than the number of following series of vanes, see Fig. 2. As it is important to avoid impact losses and losses due to eddies resulting from the entrance of fluid in the driving, driven and guide vanes rows at different angles, it is known, from aeroplane practice, that thick and round inlet edges on curved wing-shaped vanes possessing a variable inclination of their chord to fluid velocity contributes materially to the smooth inflow of fluid in the passages between the vanes, especially when entrance vanes are smaller in number than the number of vanes in the following vane rows. Favorable inflow conditions decide efficiency of whole transmission: in Fig. 2, it can be noted that blade rows with different but gradually increasing number of curved vanes provide a different but gradually curved channel with different but gradually increasing cross-section area, so the direction of the fluid can be gradually changed to a different degree as well as circumferential velocity of incoming fluid can gradually be decreased, especially at low speeds, which gradual decrease is the condition necessary to convert kinetic energy into pressure energy, so a high gearing ratio of a device could be obtained at heavy loads. The gradual curved channel with increasing number of curved aerofoil vanes causes the fluid to flow therethrough with gradually decreasing circumferential velocity, which in turn increases the amount of pressure energy forwarded from the runner to the next wheel at heavy loads; in the case of impeller the gradual deviation also increases pressure at the outlet of the impeller. In the case of guide wheel, however, the gradual curvature of the channel increases circumferential velocity of the working fluid as it flows between the vanes and gradually increases fluid angular momentum. This unloads the impeller and increases gearing ratio. It is evident, in Fig. 2, that number of vanes which might cause shock losses, is small while fluid velocity is high and that number of vanes increases when fluid velocity was already decreased; this naturally decreases shock losses to a minimum.

In my co-pending application Ser. No. 475,278, filed Aug. 14, 1930, now Patent No. 2,186,025, Fig. 20, similar result is obtained by vanes with a larger radius of curvature at the entrance, but a small radius of curvature at the exit, so the angle of divergence is small at points of high fluid velocities, but at points of low fluid velocities the angle of divergence is greater and still the efficiency of the velocity to pressure change is not effected much because internal friction losses are in proportion to the square of the fluid velocity.

That is why I have designed impeller, runner, and guide wheel having blade rows with different number of blades. Fig. 2 shows discharge angles of the impeller and the runner being almost 90 degrees.

This turbo-transmission of itself does not provide a reverse motion; for the latter purpose a reverse gear is used which can be equipped with a supplementary train of gears to afford an extra low gear ratio for emergency. Without a reverse gear the device is not complete and cannot be used on vehicles.

The cover 51 serves also as a case for a change speed gear, which can be of any well known construction, but I prefer a sliding change gear type, in which shifting can be accomplished by hands or by feet. A third shaft 105, supported by bearings 106, 107, is carried through a small cover 108, fastened by bolts 109, and is provided by a spline 110 for attaching a propeller shaft flange 111 for a vehicle drive.

The gear 77 meshes with a gear 112 carried by a countershaft 113 by roller bearings 114, 115, the shaft 113 being secured in case 51. Integral with gear 112 are gear 116 for reverse drive and gear 117 for emergency low gear. Gear 116 meshes with an idler gear 118 and this in turn meshes constantly with a gear 119 revolving on a sleeve 120 and held by plate 121; both sleeve and plate being pressed on the third shaft. This shaft also carries a sliding gear 122 shiftable axially on a spline 123 by fork 124 secured to shift rod 125; this gear when shifted forward, meshes with gear 117.

Two individual clutches are used to lock the third shaft with the runner shaft for forward drive, or to connect the third shaft with the reverse gear for reversing. These clutches embodied in the gear transmission, allow changing from forward to reverse and vice versa without the necessity of bringing the vehicle to a complete stop before changing transmission gears can be attempted. Just the opposite: it is of advantage to change gear drive before the vehicle stops and use the engine power as a very efficient brake which operation not only saves the time and effort of the driver, but also saves the brakes. Also, there is always some drag of fluid present in a fluid power transmitter which makes the shifting of ordinary change speed gears impossible in cool weather.

The clutches drawn in Figures 1 and 7 are of the expanding type; of course, any other type of friction clutch can be used, as they are well known in automotive industries. As will be seen from the drawings, the forward end of the third shaft has a spline 133, and carries on it two discs: 126, 126a rigidly mounted on a splined sleeve 127; each disc is provided with a finger 128 (128a) and a cam 129 (129a), see also Figure 37. A band 130 for forward drive (130a for reverse drive) is expanded by cam 129 (129a) and finger 128 (128a), which in turn is operated by a conical sliding head 131. The sliding head is operated by a shift fork 132 secured to the shift rod 102; shift rods 102 and 125 are operated in the conventional way, that is, by shifting hand lever 134; the expanding bands are in drums 770 and 1190, and they are integral with gear 77 and 119; the bands are kept centrical by arms 135; each finger is pressed against the head by spring 136.

When the sliding head is moved axially forward it raises finger 128 and expands band 130 by means of cam 129; the band 130 is then pressed against drum 770, locking gear 77 with the shaft 105 for a forward drive.

Without these friction clutches it is impossible to change gears when starting in cool weather; because a cool engine cannot slow down properly, and the drag of the cool fluid is at its worst; also, there is a considerable inertia of the runner, which must be overcome, in order to effect reversing.

At high speeds, say above sixty miles per hour, it is an advantage to connect the runner directly to the impeller for direct drive. This is accomplished by a centrifugal clutch, see Figure 5. The runner web 70 carries a stud 140, upon this stud is pressed an arm 141, provided with a pin 142, which serves as an anchor for brake band 143, faced with brake lining 144, asbestos, etc. Stud 140 is also the fulcrum of bell-crank 145 carrying pin 147, and adjusting screw 146, the screw is secured to the end of clutch band 143 by means of a pin 148. The engaging pressure is furnished by a centrifugal force of long lever 149 (part of the bell-crank 145). The action of centrifugal force of the lever is governed and counteracted by a tension spring 150, whose one end is anchored to the clutch band and the other to the lever.

In operation, when the runner shaft rotates at slow speed, the spring 150 maintains the clutch band out of engagement with the impeller web, so that no torque can be transmitted from the impeller to the runner directly. At high speeds of the runner the centrifugal force of the lever 149 overcomes the spring tension, and the clutch band expands and engages the impeller web 65. Created friction transmits turning moment directly from the impeller to the runner, consequently the primary and the second shafts become locked together. As soon as the impeller and the runner become locked together, the guide wheel must become inoperative, and must stop to increase angular momentum of the fluid and in this way to cease to cause resistance to circulating fluid. This is accomplished by turning the guide wheel helically out of the fluid circuit automatically, when the whirl velocity at runner discharge increases due to increased rotative speed of the runner. Whenever the runner speed decreases below a certain predetermined limit, the spring 150 disengages the clutch and the device becomes a turbine power transmitter.

In the space formed between the primary and the secondary shafts is located a one-way clutch, see also Fig. 14, which consists of: a three lobed inner cam 151, integral with shaft 76, an outer ring 152 pressed in the impeller web, three sets of rollers 155, 156, which are held in contact with the cam and the ring by means of springs 153 and guiding blocks 154. The overrunning clutch enables the engine to be driven by the inertia of the car, prevents the car from coasting, and enables the engine to be used as a brake.

In operation, when the runner shaft tends to overcome the engine shaft, the cam 151 produces a wedging action upon the rollers 155, 156; created friction between the rollers and the impeller web transmit the turning moment directly. On the contrary, at normal and heavy loads the impeller rotates faster than the runner and no wedging action can occur.

For purposes of balancing axial thrust a number of openings 157 in the runner web, 158 in the impeller web, and 159 in the stationary flange are provided, in order to equalize pressures on the right and left side of said webs. In order to decrease short circuit losses through these openings, small clearance spaces 160—164 are provided.

For safety purposes a valve with a ball 165, a spring 166, and spring retainer 167 is provided. If for any reason, for instance heat, or gas formation, pressure inside casing 50 should rise above a certain predetermined pressure, part of fluid or gases can escape through this valve.

It is obvious that in turbine torque converters the working fluid often attains a temperature which is dangerously high. Therefore I have provided an entirely positive cooling means for the circulating fluid, a radiator; in case oil is used as a working medium the same radiator can also be used for cooling the oil in the lubricating system of the engine to which the power transmitting device is coupled.

Referring now to Fig. 5, the numeral 170 indicates a radiator of any suitable construction, its lower chamber 171 communicating through a pipe 172 with an inlet located close to the center of casing 50. The upper chamber 173 is connected to an outlet in casing 50 by a pipe 174 (see also Fig. 1). Rotation of the impeller also causes the liquid to rotate in the casing; a pressure will be created, which increases toward the periphery of the casing. This pressure difference causes the oil to flow from the casing to the upper chamber of the radiator and from the lower chamber back to the casing. The radiator and the turbine power transmitter are filled with the working fluid through inlet 175 to the radiator. A sheet metal shroud 176 is provided to guide the air blown by the fan-shaped flywheel between fins 177 integral with casing 50 and between sheet metal fins 178 cast in the casing; copper, aluminum or other good heat conductors can be used for these fins. Another part of the air is blown through the radiator.

Another very important item is the problem of balancing and preventing the vibration of the device from being transferred to the frame of the vehicle. It is obvious that all moving parts of the apparatus cannot be properly balanced; their shape and curvatures being rather complicated, complete balancing would be too costly. For this reason I have designed a flexible support for turbine transmitters so the vibration cannot be transferred to the frame. A spring 179 with several leaves, is clamped to the transmitter by a plate 181 and bolts 182; the spring is bent in order to make it flexible, not only horizontally but also vertically, and is held by rubber supports 183, 184, which supports are fastened to vehicle frame 185 by means of brackets 186, 187. In this way, because the transmitter is freely suspended, no shocks can be transferred to the frame; at the same time torsional moment transmitted to propeller shaft is equalized by the action of the spring, resulting in a steady torque at the vehicle wheels even if the engine has only a small number of cylinders, for example, four.

In order to reduce the pulsations of working fluid and equalize the pressure especially when a four cylinder engine with uneven torque is used with the transmitter, I have provided an air vessel 190 connected with casing 50 by pipe 191.

It will be seen that the gist of my invention consists broadly in the provision of certain means to shift automatically under the control of fluid and manually while in operation, the guide vanes of the turbine torque converter entirely out of the fluid circuit at light loads so that it becomes a turbine clutch comprising a path for fluid including driving and driven vanes only. In combination with the device a reverse gear is provided with means to shut off the fluid circuit of the turbine transmitter when the gear transmission is in neutral.

The invention operates mostly as a turbine clutch on ordinary roads, only at overload or when starting a guide wheel is shifted into the fluid circuit to increase turning moment. Therefore the device is a combination of a turbine clutch with a turbine torque converter.

An alternative arrangement of flexible vanes for the guide wheel is shown in Fig. 9. Each blade 91A is riveted to a holder 200, which in turn is bolted to the shroud of the guide wheel on one side and the web on the other side.

Another arrangement of guide vanes is illustrated in Fig. 16. Vanes 91B fastened to shroud 86B and web 85B are not parallel to the axis of the guide wheel but at an angle F. When the fluid streams outwardly at heavy loads, it has a tendency to shift the guide wheel to the left, i. e. in the fluid circuit, at light loads the fluid streams inwardly and shifts the guide wheel to the right and from the circuit. The numeral 84B is a key or spline which prevents relative rotary motion of the wheel and stationary sleeve 83B, but allows relative axial movement of the wheel upon the sleeve.

For economical cars and long non-stop trips it is an advantage to connect the runner directly to the impeller for direct drive to eliminate transmission losses, even for speeds considerably smaller than 60 M. P. H., compare with diagram in Fig. 36, line OE. This is accomplished by another centrifugal clutch, see Figs. 1 and 5. The impeller web 65 carries a stud 198, upon this stud is rotatably mounted a cam 194 integral with an arm 195 which carries a spring 197. The cam operates flexibly expanding band 193 centered by lugs 196 integral with the impeller web; the band has a male conical surface engaging a female conical surface 192 integral with the runner web.

The engaging pressure is furnished by centrifugal force of lever 195; which force is governed and counteracted by compression spring 197. In operation, whenever the impeller shaft rotates at slow speeds, the spring maintains the clutch band out of engagement with the runner, so that no torque can be transmitted from the impeller to the runner directly. At high speeds of the impeller, the centrifugal force of the lever overcomes the spring pressure, and the clutch band expands and locks the runner and the impeller.

This locking of the impeller and the runner can be accomplished only when the runner torque is smaller than full torque of the engine. When the runner torque is equal to full engine torque or is greater, the runner slides axially due to helical spline 82 and compresses a spring 812; in this way conical surfaces 192 and 193 cannot engage; as soon as the runner torque decreases the spring 812 pushes the runner toward the impeller and the cones 192 and 193 can lock, if the impeller speed is sufficiently high. This action is important when extra large torque and great acceleration is required at higher speeds, say .50 M. P. H.; no greater torque could be received if the impeller and runner would be locked at lower speeds, say 45 M. P. H. Whenever great turning moment is suddenly required and impeller and runner are locked, all that is necessary to increase engine torque up to maximum, to disengage the clutch and the torque converter increases the turning moment still further.

In Figures 15, and 17 to 35 the numerals 210 to 225 indicate the driving shafts; the numerals 230 to 245 indicate the driven shafts; the numerals 250 to 265 and 267 to 270 indicate the driving wheels, mounted to the driving shafts; numerals 271 to 291 indicate the driven wheels, mounted rigidly to the driven shafts; numerals 292—307 indicate stationary members or sleeves; numerals 310 to 325 indicate guide wheels mounted on the stationary members, being free to shift axially but limited in circular movement around the sleeve in the same way as the guide wheel in Fig. 1; numerals 330—332 indicate independently movable portions of impeller vanes carried by impeller and adapted to be automatically shifted axially into or out of the fluid circuit in a similar way as the guide vanes; numerals 335 to 339 indicate independently movable portions of runner vanes carried by runner hub and capable of being shifted axially into or out of the fluid circuit by action of the fluid in a similar way, as the guide vanes; numerals 340—346 indicate a housing of a torque converter; numerals 350—397 indicate vortex chambers.

The embodiment of the invention illustrated in Fig. 15, relates to a turbine power transmission having impeller wheel 250 equipped with a blade ring 330 and runner wheel 271 provided with a blade ring 335. At light loads both rings 330 and 335 are thrown out of the fluid circuit by the reaction of the circulating fluid in a similar way as the guide wheel in Fig. 1.

Basically the apparatus in Fig. 15 is a combination of a clutch and torque converter comprising a path for fluid including driving vanes, driven vanes, and guide vanes, said driving vanes and driven vanes having movable portions adapted to be shifted out of or into the fluid path automatically under the control of the fluid.

Fig. 17 illustrates a multi-stage turbine power transmitter equipped with impellers and runners, which are practically of the same shape as that of a screw propeller. The apparatus has two guide wheels: entrance guide wheel 311 and outlet guide wheel 312 working in a series. The second impeller 252 is connected to the first impeller by sleeve 400.

In a two stage device according to Fig. 18 fluid enters the impeller channels in an axial direction, and after passing through a double bend of 90 it leaves the impeller channel in an axial direction. The fluid flows in a similar manner through the runner channel. There are two shiftable guide wheels 313 for inlet and 314 for outlet.

A transmitter illustrated in Fig. 19 comprises blade wheels, i. e. impeller, runner, and guide wheel, including rotatable sections which may be shifted out or into the fluid circuit automatically under the control of centrifugal force. Entrance blade section 331 is slidably mounted on the impeller but it must rotate with the impeller: axial position of this section is determined by a bell crank 401 pivoted at 402 and equipped with a weight 403 which functions as a centrifugal governor; the deflection of the governor is counteracted by a compression spring 404.

In operation, when at heavy loads the impeller speeds up due to energy returned to the impeller by the stationary guide vanes the centrifugal governor maintains sections 331 in the fluid circuit. At light loads and lower speeds of the impeller, the governor deflects under the pressure of spring 404 thereby pulling section 331 out of the fluid circuit. Entrance angle of blades of the section is designed for heavy loads, while the entrance angle of blade of the impeller itself is determined for light loads.

Similarly entrance blade section 336 of the runner is determined by a bell crank 405, pivoted at 406, having a weight 407 and counteracted by a spring 408. In operation, when the secondary shaft is at rest or rotates at low speed as at heavy loads, the centrifugal governor maintains the section in the fluid circuit. At a higher speed of the secondary shaft the centrifugal governor overcomes the pressure of the spring and shifts the section out of the fluid circuit. Entrance angle of blades of the section is designed for heavy loads while the entrance angle of the main runner blades is determined for light loads and high speeds of the runner.

In this way the entrance angles of the impeller and the runner will be correct at heavy loads as well as at light loads. Principally the impeller and the runner include wheels with blades having independent blade sections, means adapted to shift said sections in or out of the fluid circuit, and a control mechanism to automatically control the operation of the shifting mechanism by centrifugal force.

Fig. 20 shows a form of power transmitter with an axially movable blade member 332 for the impeller, an axially movable blade member 337 for the runner and an axially movable guide wheel 316; the shifting is accomplished by fluid pressure.

The movable members are concentrically arranged and carried by annular disks 411, 412, 413, respectively. The control of the disks may be effected mechanically, see Fig. 1, or hydraulically, as indicated in Fig. 20. In this case the disks are shaped to form closed chambers 414, 415, 416 between themselves and the impeller. The chambers are through passages 417, 418, 419 set under the fluid pressure in the runner; at low speeds the runner vanes change part of fluid kinetic energy into pressure energy, therefore the smaller the runner speed the greater is the pressure created by runner vanes. This pressure upon the disks is counteracted by springs 420, 421, 422; thus, at heavy load and low runner speed the movable members as well as the guide wheel will be forced into the fluid passage; at light loads, however, these members and the guide wheel will be pulled out of the fluid passage. Entrance angles of the movable members are designed for heavy load, while entrance angles of the main impeller and runner are determined for the light load.

Basically the turbine power transmission in Fig. 20 comprises a passage for fluid including blade wheels, said wheels having axially movable members adapted to be thrown out or into said fluid passage automatically under the control of fluid pressure. Or it can be specified as: Turbine transmitter comprising a circuit for fluid including driving and driven vanes, guide vanes, and means adapted to shift said guide vanes out or into the fluid circuit automatically under the control of fluid pressure.

Fig. 21 illustrates an embodiment of the invention with two axially movable blade sections 338, 339 for runner and two axially movable guide wheels 317, 318; shifting is accomplished by reaction of fluid in a similar way as the shifting of the guide wheel in Fig. 1. At heavy loads the fluid impinges blades of wheels on their faces and forces them into the fluid circuit, (toward the center of the device as illustrated) by means of screw threads at their respective hubs. At light loads the fluid impinges blades of said sections on their backs and forces them out of fluid circuit, (out of the center of the device) by the same screw actions. For all sections the same applies, only for different load different section is shifted. Entrance sections 338 and 318 have angles of vanes for heavy loads, second section 339 and 317 for medium loads, while main runner 278 has vane angles determined for light loads.

Fig. 22 illustrates a form of turbine power transmitter equipped with a turbine runner 279, an impeller 258, and a substantially radial discharging guide wheel 319. A rotary housing 346 is integral with the impeller; large vortex chambers between impeller, runner, and guide wheel allow one set of fixed vanes of aerofoil shape to be used for the impeller and the runner. Sleeve 300 is fastened to the vehicle frame 423 by means of springs 424, 425; torque reaction of the guide wheel 319 is transmitted to the sleeve 300 and to the springs 424 and 425, which cushion the drive and eliminate any jerks.

Principally this device is a turbine power transmitter comprising a path for fluid which includes driving, driven and guide vanes and vortex chambers between said vanes at heavy loads; while at light loads it includes driving and driven vanes only, and vortex chambers between them.

Guide vane assembly 319 is slidingly secured to a sleeve 300 by means of multiple screw and includes: first fluid channel 426, second channel 427, third channel 428 and shut off sleeve 429. Shifting of guide wheel is accomplished by reaction of fluid against the gates and by a spring 430. At heavy loads the guide wheel is in position C, because the fluid impinging on the faces of the vanes in the channel 426 is strong enough to compress a spring 430, at medium load in position B, because the fluid impinging on the faces of the vanes in the channel 427 equals the spring pressure, and at light loads it is in position A; the heavier the load, the greater the reaction and the more the spring is compressed; channel 428 does not contain any vanes, thus, giving a free passage to the fluid, in diagram of Fig. 36 this function is represented by full line curve ABC. Or it could be arranged: position A for low speed, B for operation as clutch, position C for operation as over-running transmission, i. e. secondary shaft rotates faster than primary shaft; in this case channel 427' has no vanes, thus giving a free passage to the fluid. This function is illustrated in diagram Fig. 36 by full line curve ABCD. In Fig. 22 there are actually two different devices shown and described: First mechanism 22A which functions in a similar way as the device in Fig. 1, the only difference being that the guide wheel has two channels with angular momentum increasing vanes, which vanes deviate the fluid in tangential direction in the way that its circumferential velocity is increased: 426 for low speed and 427 for medium speed. The channel 428 has no torque increasing vanes and is for turbo clutch drive.

Second mechanism 22B equipped with a guide wheel having a low speed channel 426 with angular momentum increasing vanes (circumferential fluid velocity is increased), a clutch channel 427' without vanes, and a high speed channel 428' with torque decreasing vanes for overrunning transmission, these vanes diminish angular momentum by deviating the fluid toward the radial direction and in this way decreasing fluid circumferential velocity. Shifting of the guide wheel is accomplished in exactly the same way by reaction of fluid: at low speeds, curve AB in Fig. 36, fluid impinging vanes in channel 426 on their faces forces said channel in the fluid circuit, (toward the left); at light loads, curve BC in Fig. 36 fluid impinging the vanes on their backs forces said channel out of the circuit, (toward the right) until the channel 427' is in the circuit, which being bladeless causes no increase in torque. At very high speeds, curve CD in Fig. 36, direction of the fluid flow is such that even this channel is thrown out of circuit by fluid friction, toward the right, and the channel 428' is forced in the circuit; channel 428' is equipped with vanes which decrease the angular momentum of the fluid, by decreasing its circumferential velocity. When the channel 428' is in circuit, the impeller torque becomes greater than the turbine torque, curve CD in Fig. 36.

The secondary shaft 236 carries the runner 279 by means of a sliding spline 431; driving shaft 216 (the crankshaft) is equipped with mating spline 432; the secondary shaft can be shifted while in operation axially by means of a sleeve and groove 433 integral with shaft 236 and by means of a fork 434; in this way the spline 431 can be shifted into the spline 432 and driving and driven shaft become locked.

In Fig. 24 a guide wheel 320 has again three channels, and operates in the same way as in Fig. 22. A runner has two fluid channels 280 (for light load) and 281 (for heavy load) and is mounted on a helical spline 435; runners axial position is determined by its torque and by a spring 436: the greater the torque, the more the spring becomes compressed.

Fig. 25 represents an embodiment of my invention with an impeller and a runner having two fluid channels: 260 and 282 for heavy loads; and 261 and 283 for light loads. The impeller can be axially displaced, being mounted on a helical spline 437; its position is determined axially by driving torque and by a spring 438: the greater the torque, the more the spring 438 becomes compressed.

In the form illustrated in Fig. 26 there is shown a guide wheel 322 with two passage rings 437 and 438, and with a shut off sleeve 439. Means for shifting the guide wheel consist of: an annular fluid tight chamber 440 in the housing 343, a plurality of rods 441, each rod provided with a compression spring 442; the chamber is connected with a vortex chamber 385 in the runner by means of openings 443 and 444. In this way fluid pressure from the runner is transmitted into the chamber 440; this fluid pressure displaces axially the guide wheel: the heavier the load, the greater the pressure, and the more spring 442 compresses. By rods 441 fluid circulation can be stopped, manually, entirely by means of shut-off sleeve 439.

A form shown in Fig. 27 is similar to the form in Fig. 26, but axial displacement of the guide wheel is determined by the amount of the runner torque. A runner 285 is mounted on a driven shaft 240 by means of a helical spline 445; position of the runner is fixed but the shaft 240 can be displaced axially: the greater the driven torque the more spring 446 compresses and the more the shaft moves toward the right. Two collars 450 integral with the shaft operate a lever 447 located between two pins 448 on a lug 449 which is integral with a housing 344; the lever is pivoted at 451 and operates a rod 452, which shifts the guide wheel: at heavy loads the guide wheel is pushed in as shown in Fig. 27, while at light loads the guide wheel is located toward the right.

According to Fig. 28, a guide wheel 455 can be displaced axially by turning a screw 456 in housing 458 by means of crank 457.

A turbine clutch shown in Fig. 29 is equipped with a centrifugal clutch 460 substantially of the same design as illustrated in Figs. 1 and 5. By means of this clutch an impeller 264 becomes locked to a runner 286 at high speeds.

A friction clutch, see also Fig. 8, is used to make the runner speed the same as the speed of the third shaft 105B (corresponding to shaft 105 in Fig. 1) by means of friction at the moment just before the gears of a gear transmission (not shown) are locked by jaw clutches. The device, embodied in the gear transmission allows easy shifting from high to second or from forward to reverse and vice versa. There is also always some drag of fluid present in a fluid power transmitter which makes shifting impossible, especially in cool weather; therefore, the friction clutches are necessary.

These novel and useful features are obtained through the use of synchronizing friction clutches, which are located between the forward gear 77B and the second gear 119B. As will be seen from the drawing, the forward end of the third shaft has a spline 133B and carries on it a sliding head 461. In the two faces of this head there are two female conical surfaces 462, 463 which can be provided by bronze liners. Engaging with these are corresponding male cones 130B, 130C which are carried on extensions of the main drive gear 77B and of the second gear 119B. Sliding on the clutch head 461 is a toothed-sleeve 131B, Fig. 8, operated by a shift fork 132B, secured to a shift rod 102B; fork 132B, not shown in Fig. 29, is of the same design as corresponding fork 132 in Fig. 1, and rod 102B, not shown in Fig. 29, is of the same design as corresponding rod 102 in Fig. 1; shift rod 102B is operated in a conventional way by a shifting hand lever as shown in Fig. 1. The internal teeth of the sliding sleeve 131B fit corresponding external teeth on the sliding head. Carried within the head is a series of plunger poppets 464, at least two in number but preferably four to insure proper action, each pressed by spring 465. There is a groove 466 on the inside of the sliding sleeve which matches the contour of the ends on the poppets.

In order to move the outer sleeve axially, it is necessary to raise these four poppets against their combined spring pressure. The resistance created by these poppets causes the clutch head to slide along the spline 133B on the third shaft, into engagement with the mating cone; moving forward, for example, engages the cone 130B on the main drive gear 77B with the cone 463 on the head to synchronize the runner shaft with the third shaft for getting into high.

As soon as the poppets have been lifted out of their groove 466, the outer sliding member 131B can travel on forward to engage teeth of the main drive gear; when the outer sliding member travels backwards, it engages teeth of the second gear 119B. The ends of teeth are chamfered, of course, to facilitate engagement of the sliding sleeve over the clutching head.

Without these friction clutches it is impossible to shift when starting in cool weather, because a cool engine cannot slow down properly and the drag of the cool fluid is at its worst, also there is considerable inertia of the runner to overcome in order to effect the engagement; briefly, shifting without synchronizing for turbine transmitters is not possible or practical.

Basically the device in Fig. 29 is a turbine power transmitter having a path for fluid including driving and driven vanes, and automatic means to lock said driven vanes and said driving vanes by centrifugal force.

Fig. 30 represents a turbine clutch equipped with a one way clutch 470 between driving and driven members of similar construction as shown in Fig. 14. This clutch enables the use of engine as a brake. Fundamentally the apparatus is a turbine power transmitter having a path for fluid including driving vanes, driven vanes, and vortex chambers, and automatic means to effect coupling of said vanes, when the velocities of the vanes vary in the one direction, and uncoupling when said velocities vary in the opposite direction.

The embodiment of the invention illustrated in Fig. 31, is related to a turbine power transmission having driving vanes, driven vanes, and a guide wheel with a plurality of passages, automatic means to effect axial displacement of said guide wheel under the control of the speed of said vanes, and automatic means to effect coupling and uncoupling of said driving and driven vanes under the control of torque of said vanes.

Guide wheel shifting mechanism consists of a centrifugal governor 471 held by a spring 472 attached to sleeve 473 rigidly secured to runner shaft 243; the governor is carried by a bell crank 474 pivoted at 475 and equipped with a fork 476; the fork shifts a sleeve 477, which in turn operates lever 478 with a fulcrum at 479 held by lug 480; the lever is pivotally secured at 481 to rod 482, which rod shifts the guide wheel 324. At high speeds of the runner the guide wheel is shifted in, a channel 483 is operative; at low speeds, however, the guide wheel is out and a channel 484 is operative. It is apparent that more than two channels can be used, each for different speeds.

Mechanism for locking of impeller and runner is substantially a multiple disk friction clutch operated by axial displacements of impeller and runner. The impeller is mounted on a driving shaft 223 by means of helical spline 486 and spring 487 and carries disks 488, 489 which can slide axially upon the impeller hub 490 but must revolve with the hub. The runner is secured to a driven shaft 243 by means of helical spline 491 and spring 482; the runner carries disks 493, 494 which can slide axially upon the runner but must rotate with the runner. The greater the impeller torque the more the impeller moves axially toward the runner until at full but normal load the impeller and the runner become locked by the friction clutch located between them. At overloads, however, the runner torque increases and the runner compresses spring 492 and the runner shifts away from the impeller and consequently the clutch cannot become locked. Also at very light loads or at standstill the clutch cannot act because the impeller shifts from the runner due to spring 487.

Figures 32, 33, 34, 36 illustrate a turbine power transmission having a two stage impeller and runner and a one stage guide wheel 306 with movable and flexible vanes 495 integral with pivot 501 and pinion 502; all pinions are in mesh with a common ring spur gear 1306 so as to rotate simultaneously around their pivots 501; one pivot has an extension 496 integral with lever 497 operated by rod 498 by means of a yoke 1498 supported by guide 499 which guide is integral with stationary guide wheel 306. The rod is operated by cam 500 which is integral with shaft 503 operated by pedals 504F and 504R and rotatable in a bearing 505 integral with the guide wheel. Shaft 503 operates link 506 by means of lever 507, the link displaces axially the shift rod 102C of a gear transmission similar to Fig. 1, (not shown).

In Figs. 32 and 33 the gear transmission is in neutral, and the guide wheel channels are closed by rotatable vanes 495. When pedal 504R is pushed down, the shift rod 102C moves backwards and shifts the gear transmission in reverse (see Fig. 1), if pedal 504F is pushed down, the shift rod 102C travels forwards and shifts the gear transmission in forward. When in forward or in reverse rod 498 is down and guide vanes 495 are open, see Fig. 34, so the device can act as a torque converter. The function of the device is represented by full line curve ABCD in diagram Fig. 36 where part AB shows the function at heavy load due to flexible gates 495, BC illustrates function as a turbine clutch: vanes 495 are eccentrically pivoted and have a certain amount of free movement due to lever 497 having a clearance in yoke 1498; line CD represents overrunning function for high speeds, driven shaft rotates faster than driving shaft.

Basically this device is a combination of a gear transmission and a turbine transmission having driving and driven vanes and a guide wheel with movable gates, and means adapted to close the fluid circuit of said turbine transmission, when the gear transmission is in neutral, said means capable of opening the fluid circuit when the gear transmission is in a forward speed or in reverse.

Fig. 35 shows a form of power transmitter with the impeller and the runner equipped with rotatable vanes 510, 511, respectively, secured to pivots 512 and 513; rigidly secured to these pivots are gear pinions 514 and 515 meshing with gears 517 and 516, integral with driving shaft 225 or driven shaft 245. The impeller is mounted upon its shaft by helical spline 518, and the runner is mounted upon its shaft by helical spline 519.

When the torque of the impeller varies, compression of spring 520 also will be variable, consequently the driving shaft displaces axially in relation to the impeller, this axial movement causes limited amount of angular movement due to the helical spline and the angular movement creates a rotary motion of pinions 514 upon the gear 517, and finally the partial rotation of the pinions adjusts the angle of the vanes 510. Function of the runner is similar: when the torque of the runner increases, spring 521 compresses, the driven shaft displaces axially in relation to the runner, this movement causes an angular movement due to the helical spline and the angular movement creates a rotary motion of pinions 515 upon the gear 516, and finally the pinions adjust the angle of the vanes 511.

Basically the apparatus in Fig. 35 is a turbine transmission having an impeller with movable vanes, a runner with movable vanes and a guide wheel, and automatic means to adjust angles of said impeller and runner vanes according to the load of said impeller and said runner.

Fig. 36 illustrates that the device of Fig. 1 is substantially of "rising characteristic" i. e. engine speed increases only when turbine speed increases. In this way excessive engine wear at heavy loads is prevented. The device described in my Patent 1,855,967 is of "falling characteristic" and the device in Patent No. 2,186,025 is of "constant character".

In order to obtain a "rising characteristic" the discharge angle C' of the guide vanes must be larger, (C' equals about 30 degrees) than in the device of Patent No. 1,855,967, so the impeller speed at the start is smaller; as the turbine speed increases this angle C' should decrease by the amount Er (see Fig. 6); but it must close faster than in the device of Patent No. 2,186,025, with constant character, so the speed would increase, instead of being constant, i. e. decrease of discharge angle Er for device with rising character must be greater than decrease of same angle Er for device with constant character; this of course is easily regulated by proper springiness of vanes. Curve A to B in Fig. 36 is for heavy loads, when device is a torque converter; curve B to C is for light loads when device is a clutch. Finally curve C to D is for overrunning transmission illustrated in Fig. 22 (case B).

What I claim is:

1. Turbine power transmission comprising a circuit for fluid including an impeller wheel energizing a fluid, a turbine wheel receiving energy from said fluid, and a guide wheel deviating said fluid, said guide wheel capable of being thrown into or out of the fluid circuit automatically under the control of the reaction of said power transmitting fluid, said wheel comprising the whole circuit in which the fluid is circulating and power transmitting from said impeller to said turbine.

2. Turbine power transmitter comprising a path for fluid including a pump impeller, a turbine runner, and a guide wheel with plurality of channels, and means for by-passing the fluid freely and without obstruction through one of said channels, all said channels but one having turning moment changing blades, said energizing impeller, said driven runner and said guide wheel forming a circuit in which the fluid is circulating and power transmitting.

3. A turbine power transmitter including primary fluid energizing rotary means mounted on a driving shaft, secondary energy absorbing rotary means mounted on a driven shaft and adapted to return the fluid to said primary means, helically formed means to fasten one of said rotary means to its shaft allowing limited helical movement between said rotary means and said shaft, automatic means carried by one of said rotary means to effect coupling or uncoupling of said rotary means to each other under the control of the speed of said rotary means, said relative helical movement automatically counteracting said coupling action under the control of the turning moment of said shaft.

4. Turbine power transmitter comprising a circuit for fluid including driving vanes energizing fluid, driven vanes receiving energy from said fluid, and guide vanes interposed between the exit from said driven vanes and the inlet to said driving vanes, and automatic means for shifting said guide vanes so as to bring said guide vanes in or out of the fluid circuit under the control of the fluid torque reaction, resistance to the circulation of the fluid due to said guide vanes being removed, said guide vanes being out of the fluid circuit at high speeds.

5. Turbine power transmitting clutch including primary rotary means adapted to energize fluid, secondary rotary means for receiving fluid directly from said primary means and returning said fluid directly to said primary means, automatic means adapted to effect coupling or uncoupling of said rotary means with respect to each other under the control of the speed of one of the said rotary means, and automatic means carried by one of said rotary means to effect coupling and uncoupling of said rotary means with respect to each other under the control of the other rotary means.

6. In a power transmitter a driving shaft, a driven shaft, a primary blade wheel mounted on the driving shaft and a secondary blade wheel mounted on the driven shaft, means to move one of said blade wheels axially with respect to the other of said blade wheels, speed controlled means to fix said driving and driven shafts together and to effect disengagement of the driving and driven shafts in accordance with the position of said axially movable blade wheel.

7 Turbine power torque converter comprising a circuit for fluid including a pump impeller energizing the fluid, a turbine runner driven by the fluid, and a guide wheel with vanes deviating the fluid, and automatic means adapted to helically shift said guide wheel out and into the circuit when the direction of the fluid flow varies with respect to said guide vanes resistance to the circulation of the fluid due to said guide vanes being substantially decreased when said guide vanes are out of the fluid circuit.

8. Turbine power transmitter comprising a passage for fluid including driving vanes energizing the fluid, driven vanes receiving energy from the fluid, and guide vanes deviating the fluid, said guide vanes being axially shiftable in one direction by means of fluid impinging on their backs and shiftable in the other direction by means of fluid impinging on their faces.

9. Turbine power transmitter comprising a circuit for fluid including series of driving vanes energizing the fluid, series of driven vanes receiving energy from the fluid, and guide vanes deviating the fluid, first series of said driving vanes and driven vanes being pivoted near the entrance edge with the exit edge overlapping the entrance edge of the following vane so that the pivotal action is restricted in the direction of the following vane.

10. In a turbine power transmission a driving shaft, a driven shaft, a primary rotary blade wheel mounted on said driving shaft, a secondary rotary blade wheel mounted on the driven shaft, a stationary member, a guiding blade wheel having fluid directing channels mounted on the stationary member, a fluid in the circuit formed by said wheels, some of said wheels having limited helical movement relative to the means upon which they are mounted, automatic means to effect coupling or uncoupling of said rotary wheels with respect to each other under the control of the speed of one of said rotary means and also under the control of the turning moment of the other rotary means through said helical movement.

11. A fluid power transmitter comprising a circuit for fluid, rotary driving means energizing a fluid, rotary driven means receiving energy from said fluid, guide vanes operable to modify the angular movement of the fluid, and automatically operable means to shift said guide vanes substantially out of or into said circuit in accordance with the difference of the speed of said rotary means, said rotary driving and driven means forming part of said power transmitting circuit.

12. Turbine power transmitter comprising a passage for circulating fluid including a pump impeller, a turbine rotor, and an axially shiftable guide wheel interposed between the exit from the rotor and the inlet to the impeller, said guide wheel adapted to increase angular momentum of the fluid in one axial position by means of vanes, also capable of shutting off the fluid circulation when in another position, also adapted to by-pass the fluid and without any material obstruction when in a third position, automatic means for shifting said guide vanes from one of said positions to another of said positions in one direction under the control of fluid drag, and flexible means to shift said guide vanes in the opposite direction.

13. In combination a frame, a turbine power transmitter comprising a path for fluid including primary rotary means energizing the fluid, secondary rotary means receiving energy from the energized fluid, third means changing the turning moment of the fluid, yielding means between said frame and said third means to hold said third means in position and to cushion impulses and to damp out fluctuations of the angular momentum of the fluid in one direction only, said primary, secondary and third means comprising the circuit in which the fluid circulates and transmits the power.

14. Turbine power torque converter comprising a path for fluid including a pump impeller energizing the fluid, a turbine rotor driven by the fluid, and a guide wheel deviating the fluid, a stationary member with helical grooves, said guide wheel shiftable upon said grooves by means of the fluid reaction.

15. Turbine power transmitter comprising a casing, a fluid, primary rotary means energizing the fluid, secondary rotary means receiving energy from the fluid, pressure equalizing means including an air vessel connected to said casing, a conduit interconnecting the pressure equalizing means and the discharge end of the primary means, and communicating with the fluid to cushion and balance pulsations of said fluid, the fluid and the primary and secondary rotary means being located in the casing.

16. A turbine torque converter comprising a passage formed by fluid energizing and fluid driven coaxial blade wheels, a plurality of blade rows working in series with each other carried by some of said wheels, each of said rows having a different number of blades to cause a variation in the deflection of the fluid in each row, at least one of said blade wheels being shiftable in or substantially out of the passage automatically under the control of the fluid.

17. In combination, a frame, a turbine power transmitter comprising a casing, a fluid, an impeller energizing the fluid, a turbine runner driven by the fluid, and a stationary guide wheel deviating the fluid in said casing, flexible means between said frame and said guide wheel to hold said guide wheel in position to cushion impulses of the fluid, said impeller and said runner and said guide wheel comprising the circuit in which the fluid transmits the power.

18. In combination, an engine having a crankshaft, a stationary flywheel housing, and lubricating system, a frame, a turbine power transmitter comprising a casing, a circulating oil, an impeller with vanes, energizing the oil, a shaft to rotate said impeller, a turbine runner with vanes driven by the oil, a driven shaft alined with the driving shaft supporting said runner, a guide wheel in said casing, said guide wheel capable of increasing the angular momentum of said fluid, also adapted to stop circulation of the fluid, as well as adapted to pass the fluid without any obstruction whatever, said vanes having the shape of an aerofoil, a stationary sleeve fastened to said housing and provided with helicoidal grooves with stops on each end of said grooves, said guide wheel equipped with projections meshing with said grooves, fins made from a good heat conductor cast in said casing, a radiator for cooling the oil, means for conducting oil from said transmitter to said radiator, and means for returning oil from said radiator to said transmitter, means for conducting oil from said lubricating system to said radiator, and means for returning said oil from said radiator to said lubricating system.

19. A fluid power transmission including a casing, a fluid in the casing, primary rotary means in the casing energizing the fluid, secondary rotary means in the casing receiving energy from the fluid, fluid directing means operable to increase the turning moment of the fluid in the casing, said primary secondary and fluid directing means forming a fluid energizing and power transmitting circuit, and yieldable means connected with the interior of said casing to equalize pulsations of the torque of said rotary means, the connection from the yielding means being located at the entrance to the secondary means.

20. In a fluid transmission a driving shaft, a driven shaft having a helical spline, a primary blade wheel carried by the driving shaft, a secondary blade wheel carried by the driven shaft and movable axially in the helical spline, yielding means urging the secondary blade wheel toward one extreme position, and a friction clutch operable to interconnect the driving and driven shafts, said clutch being inoperative when said secondary blade wheel is urged by its turning movement toward one extreme position to compress said yielding means.

21. A fluid power transmitter comprising a driving element, a driven element, a primary member fixed to the driving element, a secondary member carried by the driven element, guide vanes to direct the fluid, and means to automatically shift said guide vanes axially to inoperative position at high speeds of said secondary member.

22. A fluid power transmitter comprising a fluid circuit including rotary driving means energizing the fluid and rotary driven means receiving energy from the fluid, guide vanes operable to guide the fluid, and automatically operable means to move the guide vanes out of or into the fluid circuit in accordance with the speed of the rotary driven means, said rotary means forming part of said power transmitting circuit.

23. A turbine power transmitter comprising a circuit for fluid including driving, driven and guide vanes, and automatic means for transferring the guide vanes in or out of the fluid circuit under the control of fluid torque reaction as well as fluid drag and pressure, the resistance to the circulation of the fluid due to the guide vanes being substantially decreased when the guide vanes are out of the circuit.

24. A turbine power transmitter including a passage for circulating fluid comprising a pump impeller a turbine rotor and a shiftable guide wheel, vanes on the guide wheel operable to modify the angular momentum of the fluid in one position and to by-pass the fluid freely and without substantial obstruction from the guide wheel when in another position, automatic means for shifting the guide wheel from one of said positions to another position in one direction under the control of fluid drag, and yieldable means to shift the guide wheel in the opposite direction.

25. A power transmission including primary and secondary rotary means forming a fluid circuit, automatic means to effect coupling or uncoupling of the primary and secondary rotary means with respect to each other under the control of the speed of one of said rotary means, and automatic means carried by one of said rotary means to effect coupling or uncoupling of said rotary means with respect to each other under the control of the other rotary means.

26. In a power transmission, driving means, driven means, a primary rotary member mounted on the driving means, a secondary rotary member mounted on the driven means, one of the rotary members having a helical movement relative to the means upon which it is mounted, automatic means to effect coupling or uncoupling of the rotary members with respect to each other under the control of the speed of one of the rotary members and under the control of the turning moment of the other of the rotary means through the helical movement.

27. In a power transmitter, driving means, driven means, a primary rotary member mounted upon the driving means, a secondary rotary member mounted on the driven member, means to move one of the rotary members axially with respect to the other of said members, speed controlled mechanism associated with one of said means to fix the driving and driven means together and to effect disengagement of the driving and driven means in accordance with the position of said axially movable member relative to the position of the other of said members.

28. In a fluid power transmitter, driving means, driven means, a primary blade wheel mounted on the driving means, a secondary blade wheel mounted on the driven means, means to change the axial position of one of the blade wheels with respect to the other of said blade wheels, speed controlled means associated with one of said means to fix the driving and driven means together and to effect disengagement of the driving and driven means in accordance with the axial position of the blade wheel which is changing its axial position relative to the position of the other of said blade wheels.

29. In combination, a frame, a fluid power transmitter comprising a casing, a fluid in the casing, primary rotary means energizing the fluid, secondary rotary means receiving energy from the fluid, a member in the casing, a guide wheel mounted on the member and adapted to guide the fluid, yieldable means between the frame and the member to hold the member in a position to cushion impulses of the fluid in one direction only, the rotary means and the guide wheel comprising the circuit in which the fluid transmits power.

30. In combination an engine having a crankshaft, a stationary flywheel housing, a frame, a fluid power transmitter comprising a casing, a circulating fluid, primary rotary means energizing the fluid, secondary rotary means receiving energy from the fluid, third means guiding the fluid in the casing, a member having axially extending grooves associated with the housing, said third means having generally radially extending portions extending into the grooves, said third means being adapted to stop circulation of the fluid or to by-pass the fluid.

31. A fluid power transmitter comprising a casing, a fluid in the casing, primary rotary means energizing the fluid, secondary rotary means receiving energy from the fluid, third means guiding the fluid, a member having helical grooves fixed to the casing, third means having projections meshing with said grooves and adapted to stop fluid circulation in one operative position and to by-pass fluid when moved to another operative position.

32. A fluid power transmitter including a circuit for fluid comprising primary means adapted to energize the fluid, secondary means adapted to receive energy from the fluid, third means guiding the fluid, said third means capable of being thrown into or almost completely out of the fluid circuit automatically under the control of the reaction of the power transmitting fluid, said primary, secondary and third means comprising the circuit in which the fluid is circulating and transmitting power.

33. A fluid power transmitter comprising a path for fluid including primary means energizing the fluid, secondary means receiving energy from the fluid, a reaction member having grooves, and third means guiding the fluid associated with the reaction member and adapted to be shifted with reference to the reaction member upon said grooves by means of the energy of the fluid.

34. A fluid power transmission comprising a path for fluid including primary rotary means energizing the fluid and secondary rotary means receiving energy from the fluid, automatic means to effect coupling or uncoupling of the primary and secondary rotary means with respect to each other under the control of the speed of one of said rotary means as well as under the control of the turning moment of the other of the rotary means.

35. In combination, a fluid power transmission including a casing, a fluid circuit comprising primary fluid energizing rotary means in the casing, secondary energy absorbing rotary means in the casing, a clutch adapted to interconnect the primary and secondary means, third means guiding the fluid in the casing, a circulating power transmitting fluid in the circuit, means adapted to couple and uncouple said clutch, a mechanism between the coupling means and the third means adapted to shift the third means out of or into the fluid circuit whenever the coupling means are operated.

36. A fluid power transmission having a casing, a circuit in the casing comprising primary fluid energizing means, secondary energy absorbing means, and third means adapted to guide the fluid in the casing, a circulating power transmitting fluid in the circuit, said third means having a yieldable oscillating movement about its axis to cushion fluid impulses and damp out flow fluctuations.

37. A fluid torque converter adapted to effect speed reductions comprising an impeller wheel on a driving shaft, a turbine wheel on a driven shaft, a non-rotatable guide wheel having blades adapted in cooperation with said impeller wheel to drive said turbine wheel in the direction of rotation of said impeller wheel, and means for axially displacing said guide wheel axially with respect to both said impeller and said turbine wheels into an inoperative position outside of the fluid circuit of said impeller wheel and turbine wheel, thereby to transform the torque converter circuit into a fluid coupling circuit of the same sense of rotation having a theoretical 1 to 1 ratio and producing an unchanged torque.

38. A fluid drive comprising a driving shaft, a driven shaft, an impeller wheel on said driving shaft and of approximately U-form in radial section, a turbine wheel on said driven shaft and having an inlet adjacent the outlet of said impeller wheel, said turbine wheel having a single set of blades and discharging fluid towards the inlet of said impeller wheel, a non-rotatable guide wheel, and means for shifting said guide wheel axially with respect to said turbine wheel to position said blades between the outlet of said turbine wheel and the inlet of said impeller wheel or alternatively to remove said guide blades from the fluid circuit of said wheels, thereby to effect operation of said fluid drive as a fluid gearing for reducing speed and increasing torque or alternatively to effect operation of said drive as a coupling having theoretically a 1 to 1 ratio and an unchanged torque.

39. A turbine power transmission comprising a circuit for fluid including an impeller wheel energizing the fluid, a turbine wheel receiving energy from the fluid, and guide vanes changing the angular momentum of the fluid, the guide vanes being adapted to be shifted out of or into the fluid circuit automatically under the control of the speed of one of said wheels.

40. A turbine power transmission comprising a circuit for fluid including driving vanes to circulate fluid, driven vanes and guide vanes having operative and inoperative positions, and fluid pressure actuated means responsive to the energy of the circulating fluid to move the guide vanes to an inoperative position.

41. A fluid power transmitter comprising a circuit for fluid, rotary driving means energizing the fluid, rotary driven means receiving energy from the fluid and guide vanes operable to change the angular momentum of the fluid, and automatically operable means responsive to the torque of one of the rotary means to shift the guide vanes out of or into the fluid circuit, said rotary driving and driven means forming part of the power transmitting circuit.

42. A turbine power transmitter comprising a path for fluid including a pump impeller wheel, a turbine runner wheel, and a guide wheel having a plurality of channels, all said channels but one having turning moment changing blades, the impeller, runner and guide wheel forming a power transmitting fluid circuit, and automatic means responsive to the difference of the speed and torque of said wheels for by-passing the fluid freely and without material obstruction through one of the channels in the guide wheel.

43. In combination a transmission, manually actuated means for controlling said transmission, a fluid transmission including a path for fluid comprising an impeller, a turbine and a guide wheel, said guide wheel being shiftable by the manually actuated means, a valve associated with the guide wheel and adapted to close the fluid circuit when the manually actuated transmission is moved from one operating position to another operating position.

JOSEPH JANDASEK.